US010072702B2

(12) United States Patent
Dahinten

(10) Patent No.: US 10,072,702 B2
(45) Date of Patent: Sep. 11, 2018

(54) AIR BEARING ARRANGEMENT FOR ELECTRICALLY DRIVEN COMPRESSORS

(71) Applicant: BorgWarner Inc., Auburn Hills, MI (US)

(72) Inventor: Frank Dahinten, Neunkirchen (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/186,695

(22) Filed: Jun. 20, 2016

(65) Prior Publication Data

US 2016/0377114 A1 Dec. 29, 2016

Related U.S. Application Data

(60) Provisional application No. 62/185,572, filed on Jun. 27, 2015.

(51) Int. Cl.
*F16C 17/02* (2006.01)
*F16C 33/10* (2006.01)

(52) U.S. Cl.
CPC ........ *F16C 17/024* (2013.01); *F16C 33/1095* (2013.01); *F16C 2360/24* (2013.01)

(58) Field of Classification Search
CPC .................................................... F16C 17/024
See application file for complete search history.

(56) References Cited

U.S. PATENT DOCUMENTS 3,893,733 A 7/1975 Silver et al.
4,133,585 A 1/1979 Licht
4,167,295 A 9/1979 Glaser
4,262,975 A 4/1981 Heshmat et al.
4,300,806 A 11/1981 Heshmat
4,549,821 A 10/1985 Kawakami
5,584,582 A * 12/1996 Brown .................. F16C 17/024 29/898.02
5,902,049 A * 5/1999 Heshmat ............... F16C 17/024 384/106

* cited by examiner

*Primary Examiner* — James Pilkington
(74) *Attorney, Agent, or Firm* — Eric L. Doyle; Stephan A. Pendorf; Patent Central LLC

(57) ABSTRACT

An air foil bearing for supporting a high speed rotating assembly such as in a turbocharger, a high speed centrifugal separator or the like. The foil bearing includes at least one bump foil and at least one top foil. The top foil leading edge is bent radially outwards forming a bevel or step. This feature serves as an air guide to prevent air of the preceding pad flowing into the gap between the pads, and then between the bump foil and the top foil, causing the top foil to bear against the rotor, causing severe wear.

8 Claims, 7 Drawing Sheets

8
1
7a
a
3
4d
5a
4a
7b

AIR BEARING ARRANGEMENT FOR ELECTRICALLY DRIVEN COMPRESSORS

CROSS-REFERENCE TO RELATED APPLICATIONS

This application claims the benefit of U.S. patent application Ser. No. 62/185,572 filed on Jun. 27, 2015, the disclosure of which is herein incorporated in its entirety.

BACKGROUND OF THE INVENTION

Field of the Invention

The present invention pertains to compliant foil gas bearings, and more particularly, an air bearing arrangement for an electrically driven compressor.

Background of the Invention

Conventionally, air bearings have a cylindrical bush, at least one undulatingly bent metal sheet (bump foil) anchored at the leading edge in a slot in the bush, and at least one substantially smooth metal sheet (top foil) bent into a cylindrical shape slightly larger than the outer diameter of a rotary shaft and anchored at the trailing edge in a slot in the bush. During operation, an air lubrication layer forms between the rotor and the top foil, which air film permits sliding between the rotor an the top foil and allowing the bearing to effectively support a high bearing load. Air bearings are especially attractive in turbochargers because they eliminate the lubricating oil system, simplify the seal gas system, simplify the control system, offer lower frictional power loss, and provide greater flexibility of machine installation.

Such devices are shown in U.S. Pat. Nos. 3,893,733, 4,133,585, 4,167,295, 4,262,975, and 4,300,806. According to U.S. Pat. No. 4,549,821 (see Prior Art FIG. 1), when a resting rotary shaft 1 is located within an axial bore defined by the inner surface of the top foil 5 in the foil bearing, the center axis of the rotary shaft is slightly offset from the axis of the top foil. A wedge shaped gap is formed in the narrow space between the inner surface of the top foil and the outer surface of the rotary shaft. The motion of the rotating shaft applies viscous drag forces to the fluid (air) in the converging channel, resulting in a fluid pressure increase throughout most of the channel. The nearer to the narrow end of the wedge-shaped space, the higher the pressure of the air. The rotary shaft is forced by this higher pressure of air to return to the center axis of the top foil. Therefore, when the rotary shaft is rotated at a high speed, such a force acts to return the rotary shaft to the center axis of the top foil at all times. Air foils provide a cushioning and damping effect, functioning to accommodate eccentricity, run-out and other non-uniformities in the relative movements of the relatively moveable elements.

The air bearing may comprise one, two, or more top foils or "pads", e.g., each covering 120° of the circumference respectively in the case of three pads, each pad forming a wedge-shaped fluid-dynamic wedge channel, thus centering the shaft from three sides.

A small circumferential gap 8 forms between the successive top foils 5. Ideally, air leaving an "upstream" top foil 5 should flow across the circumferential gap 8 into the radial gap 7 between rotary shaft 1 and top foil 5 of a subsequent or "downstream" pad to produce the air pressure to center the shaft. However, in the case of a conventional top foil 5 with straight leading edge **5*d* (see prior art FIG. 1, derived from U.S. Pat. No. 4,549,821 discussed above), there is the possibility that air leaving an upstream preceding pad flows into the circumferential gap 8 between the pads and thence into the radial gap 7 between top foil 5 and bump foil 4, generating pressure between the bump foil 4 and the top foil 5. As a result, the top foil 5 will bear strongly against the rotor 1, triggering a suction effect in the gap between rotor 1 and top foil, which will further enhance contact, causing severe wear of the top foil 5** and loss of load bearing capacity and ultimately bearing failure.

SUMMARY OF THE INVENTION

After extensive experimentation with various top foil designs, bump foil designs, and combinations of top foil and bump foil designs, the inventors discovered that some modified designs of the top foil provided improvements in some operating parameters (lift-off speed, power loss, stability, maximum speed, wear) but worse performance in other operating parameters, some modified designs of the bump foil provided improvements in some operating parameters but worse performance in other operating perameters, but that an overall improvement in all operating states can be effectively achieved by employing, in combination, a bump foil with nearly uniform undulations, anchored in a bush at the leading edge, a top foil with a bend introduced into the leading edge to form a ramp or step (i.e., in the region of the circumferential gap 8) and anchored in the bush at the trailing edge, the top foil having, in a resting state, a larger diameter than the shaft diameter so that the top foil must bend and introduce pre-tension as the shaft is introduced into the bearing housing. The combination of pre-tension and leading edge bend of the top foil result in a foil bearing arrangement with pre-load producing a good lift off speed, low wear, high load capability and also durability.

BRIEF DESCRIPTION OF THE DRAWINGS

Now the present invention will be described in the following with reference to the appended drawings, in which.

Figure 1:
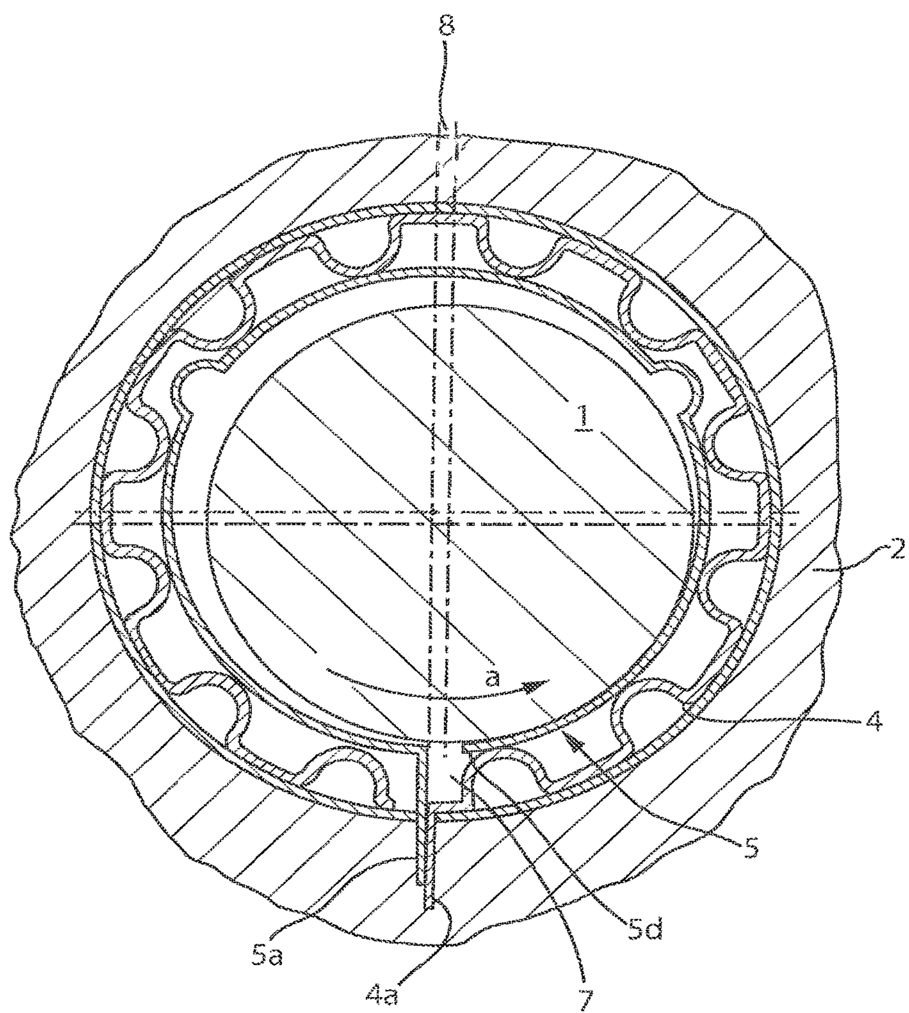
FIG. 1 is a cross-sectional view of a prior art single pad compliant foil gas bearing.
Figure 2A:
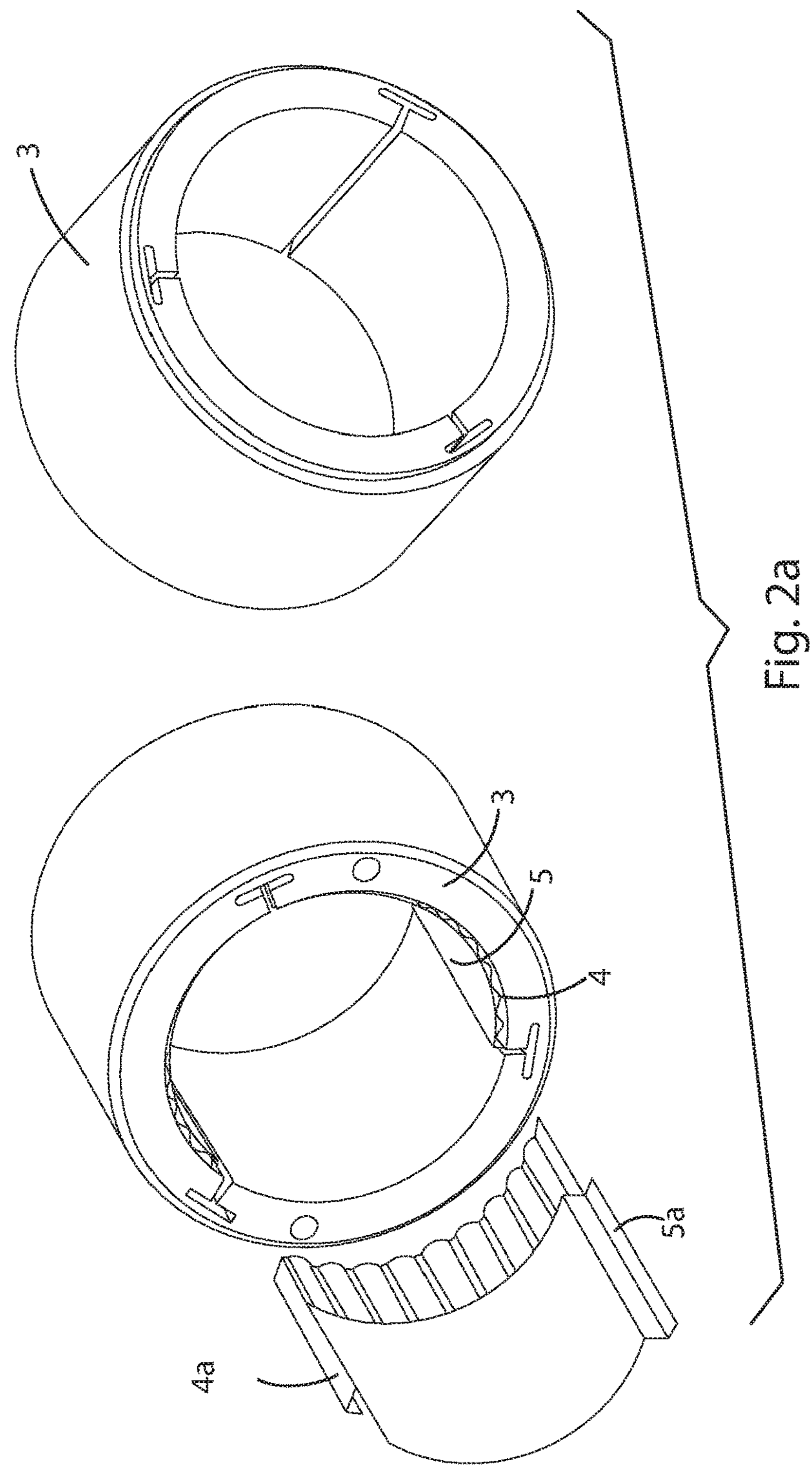
Figure 2B:
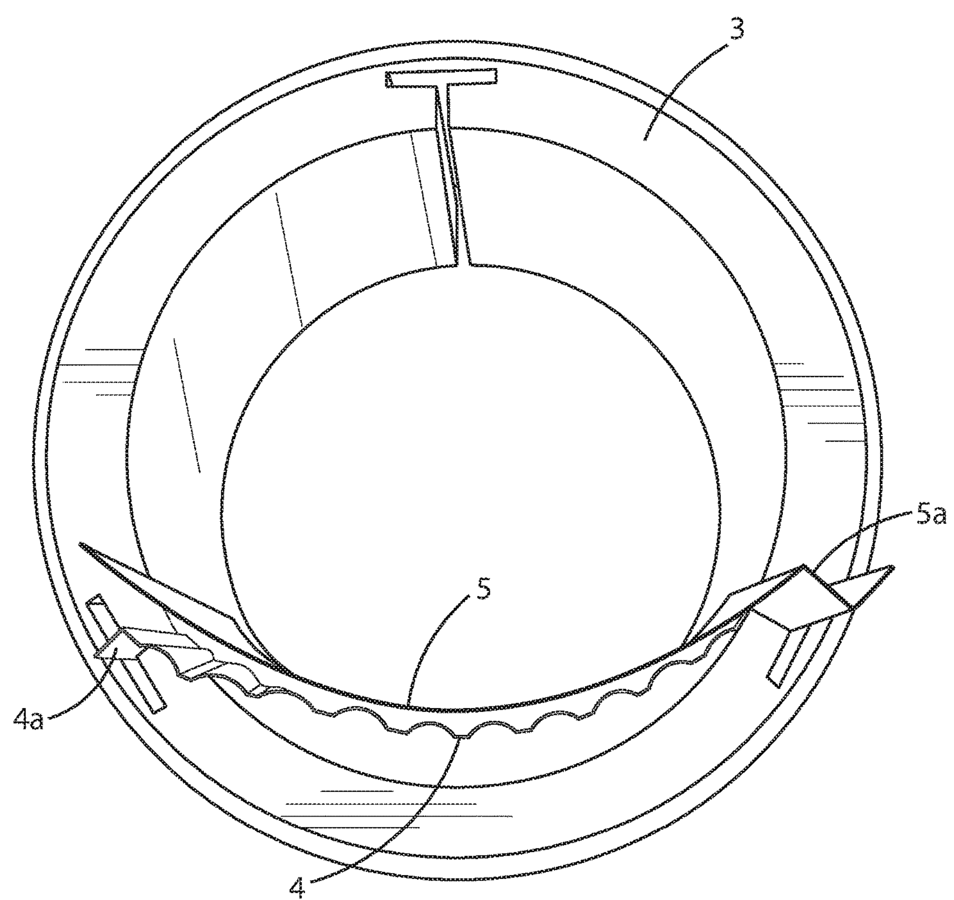
Figure 3:
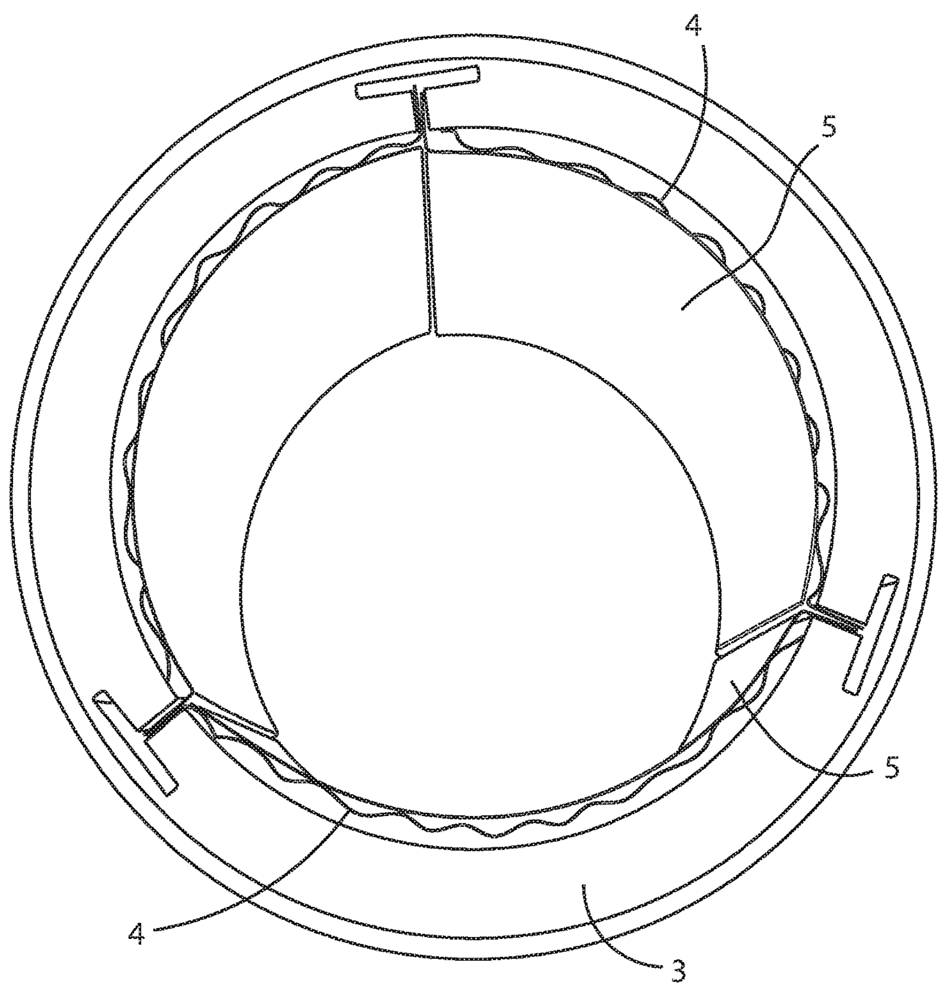
Figure 4:
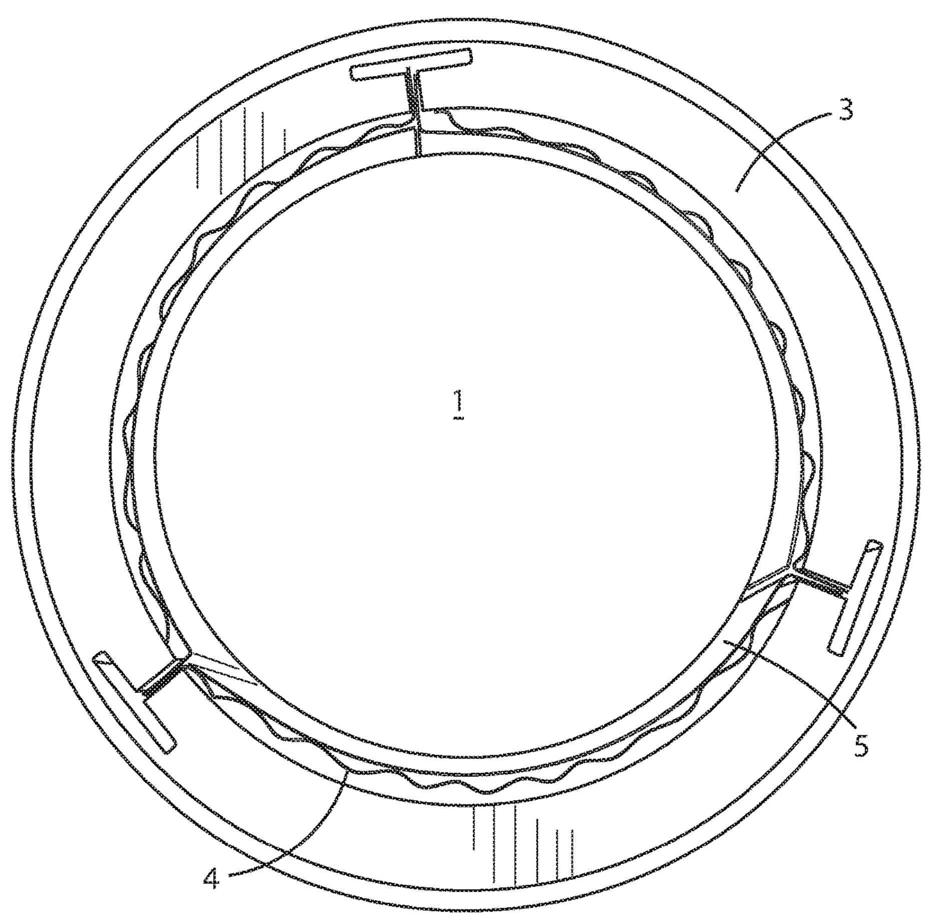

FIG. **2*a*** shows in elevated perspective view the major functional components of a foil gas bearing with bush, top foil, and bump foil in disassembled state;

FIG. **2*b*** shows a foil gas bearing with bush, one of three top foils, and one of three bump foils, in a partially assembled state;

FIG. 3 shows the bush of FIG. 2 with three top foils and three bump foils in assembled state prior to insertion of a shaft;

FIG. 4 shows the bush of FIG. 3 following insertion of a shaft; and

FIGS. **5*a-d*** show in further enlarged partial section four variations on the modified shape of the leading edge of the top foil according to the invention.

DETAILED DESCRIPTION OF THE INVENTION

The essential components of a three lobe compliant foil gas bearing are shown in FIG. **2*a*. They include a topfoil 5, with a leading edge 5*d* upstream in the direction of rotation of the shaft and trailing edge 5*a* having an anchor; a bump foil 4 having a leading edge 4*a* with an anchor and a free trailing edge; and a bush 3** having three slots for anchoring the foils.

As can be seen in FIG. 2*b*, the top foil 5, and preferably also the bump foil 4, has a greater radius than the shaft 1 or the bore of the bush, so that elastic deformation is required during assembly.

When the three top and bump foils of the exemplary embodiment are assembled into the bush, in the state prior to introduction of the shaft, as shown in FIG. 2*b*, the leading edge of the top foil 5 abuts under elastic tension against the trailing edge of the upstream bump foil 4. The top and bump foils, at this point in assembly, are partially but not fully compressed, and a noticeable air gap exists between the bush and bump foil 7*a* and between the bump foil and top foil 7*b*. The deformed state for acceptance of the shaft is shown in FIG. 3.

After introduction of the shaft 1 into the foil bearing, the foils are further compressed, so that the top foil 5 lies with tension against the shaft 1. This further elastic bending of the top foil causes the top foil to withdraw slightly from contact with the upstream top foil trailing edge, creating a circumferential gap 8. Air leaving the upstream top foil can in operation flow not only to the space 7 between downstream top foil and shaft, but also in the radial direction and into the gap between top foil and bump foil 7*b*.

A three lobe compliant foil bearing provides three gas pressure forces acting at 120 degrees from one another to stabilize and center the shaft 1 in the bearing bush 3. Again, the trailing or downstream ends of the top foils and leading edges of the bump foils are fixed to the bush 3 or journal sleeve by any suitable means, including shaping the anchored edge in the form of a retaining lug for insertion into a slot in the bush, spot welding, gluing, etc. The leading edges of the top foil and trailing edge of the bump foil are free.

Figure 5A:
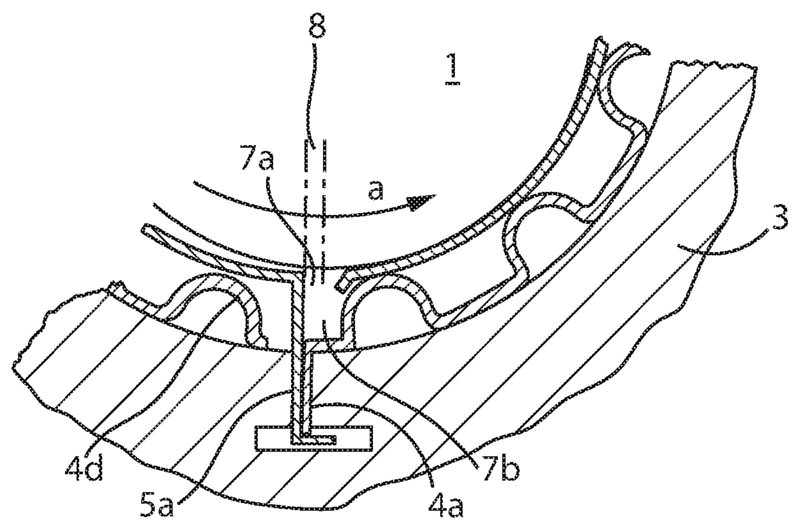
Figure 5B:
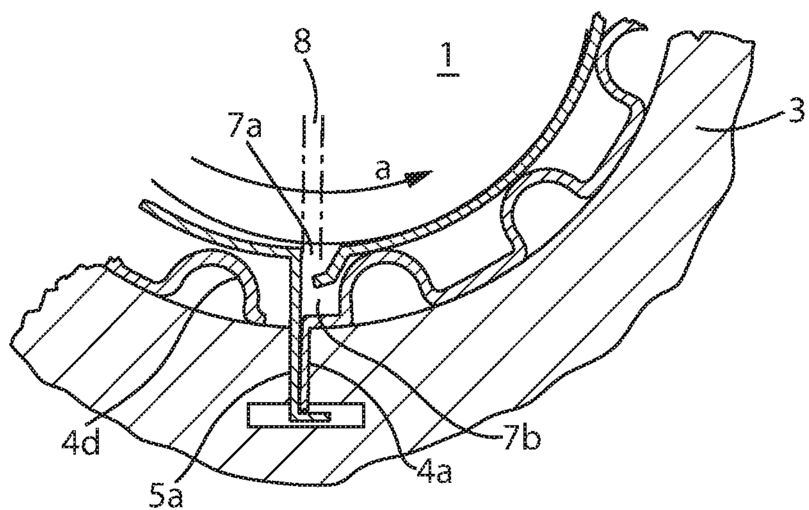
Figure 5C:
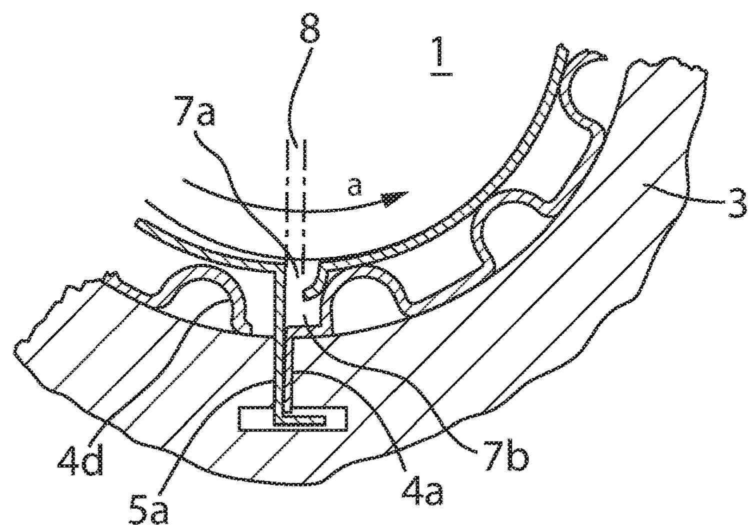
Figure 5D:
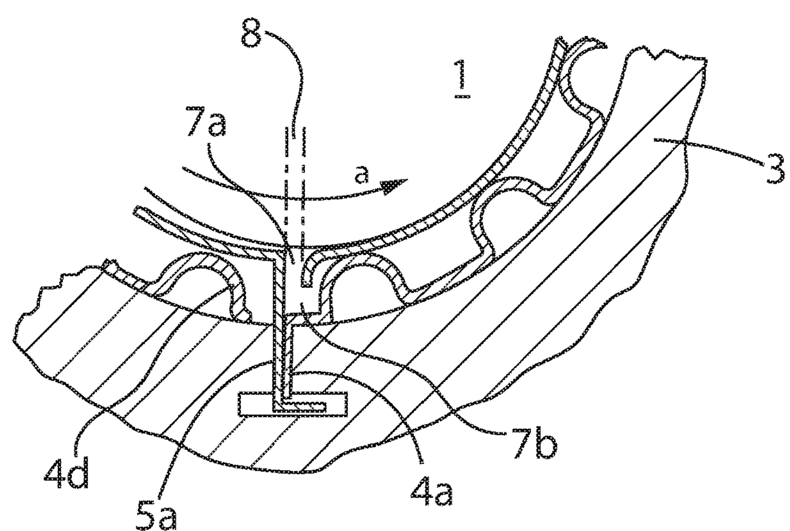

In contrast to the prior art, where the leading edge of each conventional top foil is substantially continuous with the rest of the foil, in the present invention the leading edge is bent to give a bevel or ramp or step shape. The bevel may be any shape such as a slope as shown in FIG. 5*a*, a step as shown in FIG. 5*b*, a curve as shown in FIG. 5*c*, or a reverse curve as shown in FIG. 5*d*.

This modified leading edge solves the problem common to the prior art air foil bearings in which air streaming from the top foil trailing edge can enter radially through the circumferential gap 8 into the space 7*a* between bump foil 4 and top foil 5, pushing the top foil 5 against the rotary shaft 1, causing the top foil to bear against the rotor, triggering a suction effect which will further strengthen the contact, causing severe frictional wear of the top foil and loss of load bearing capacity.

The ramp or step of the free leading edge of the top foil serves as an air guide to channel air from an upstream pad into the space between top foil and rotary shaft of a subsequent downstream pad (radial gap inner area 7*a*), while inhibiting flow of air into the gap between top foil and bump foil of the subsequent pad (radial gap outer area 7*b*). The ramp or step also provides for early lift-off of the top foil during startup of a turbocharger, when rotational velocity is small, further improving the durability and longevity of the air foil.

The shape of the bevel or ramp or step may be freely selected, so long as the shape and circumferential length of this feature cooperate to reduce air flow into the gap 7*b* between top foil and bump foil, and channel lubricating air into the gap 7*a* between top foil and rotary shaft, without however being so large as to cause too great a flow of air into the gap between top foil 5 and shaft 1.

While this modified leading edge of the top foil is a feature of the invention and thus present in FIGS. 2*a*-4, it is too fine to be illustrated in these figures and is shown in enhanced form in FIGS. 5*a*-5*d*.

The circumferential length of the step or ramp is preferably one half the wavelength of the bumps in the bump foil or less, and in the radial direction preferably extends half the radial height of the bump foil or less. More preferably, circumferential length of the step or ramp is one third the wavelength of the bumps in the bump foil or less, and in the radial direction extends one third the radial height of the bump foil or less. Most preferably, the circumferential length of the step or ramp is one quarter the wavelength of the bumps in the bump foil or less, and in the radial direction extends one quarter the radial height of the bump foil or less.

The circumferential length of the step or ramp is preferably one tenth the wavelength of the bumps in the bump foil or more, and in the radial direction preferably extends one tenth the radial height of the bump foil or more. More preferably, circumferential length of the step or ramp is one eighth the wavelength of the bumps in the bump foil or less, and in the radial direction extends one eighth the radial height of the bump foil or less. Most preferably, the circumferential length of the step or ramp is one fifth the wavelength of the bumps in the bump foil or less, and in the radial direction extends one fifth the radial height of the bump foil or more.

The freedom of movement of the free leading edge of the top foil 5 maintains the advantages of allowing the top foil to quickly follow any motion of the shaft, and the thus freely moving top foil is enabled to maintain high gas fluid pressure force against the shaft, bringing about quicker correction of shaft loss of co-axiality with the top foil. In contrast, where the shaft moves away from a pad, the pressure is reduced, allowing the shaft to be urged back towards that pad by the elastic tension in the air foil.

It is known in the art to provide the smooth top foil with a surface coating such as Emalon 333 supplied by Acheson Colloids Company of Port Huron, Mich. The coating provides a dry lubricant during start-up and shut-down when shaft speeds are too low to generate a gas film strong enough to support the shaft.

Bump foil and top foil may be made of a nickel alloy sold under the tradename Inconel and are typically approximately 0.05-0.30 mm (0.002 to 0.012 inches) thick.

While the undulations of the bump foil are preferably relatively uniform as discussed above, the present invention is not limited to uniform undulations. As taught in U.S. Pat. No. 4,549,821 the strength of rigidity of load resistance of the damp foil may be changed along the circumferential direction of the damp foil. Namely, a portion which can bear a relatively high load applied thereto and another portion which can bear only a relatively low load applied thereto are formed in the damp foil as one cycle thereof, in order to produce predetermined pressure deformations along the direction of rotation of the rotary shaft. And, at least three cycles of the aforesaid rigid portions and flexible portions to a load applied thereto and formed in the damp foil along the circumferential direction thereof. The aforesaid portions in each cycle have respectively different load resistances along the direction of rotation of the rotary shaft.

For example, the damp foil is formed into a nearly corrugated shape in section and the radius of curvature of each of these corrugated portions may be gradually decreased or increased with the advance in the direction of rotation of the rotary shaft. Or, the width of corrugations of the aforesaid corrugated damp foil may be changed. For example, at first, wide-corrugated portions (each of which has a large radius of curvature) are formed in the damp foil and then narrow-corrugated portions (each of which has a small radius of curvature) subsequent to the aforesaid wide-corrugated portions are formed therein. Thus, the wide-corrugated portions and the narrow-corrugated portions connected thereto may be formed in the damp foil as one cycle thereof, and at least three cycles of these portions are formed in the damp foil along the circumferential direction thereof.

In the narrow-corrugated portions each of which has a small radius of curvature, supporting points, each of which supports a load applied thereto, (the number of points to be made in contact with the top foil), are formed much more than those formed in the wide-corrugated portions each of which has a large radius of curvature within a predetermined angle range in the circumferential direction of the damp foil. As a result, the load resistance of the damp foil is further increased in the aforesaid narrow-corrugated portions thereof. Therefore, when the rotary shaft is rotated at a high speed, air within the space between the top foil and the rotary shaft is sucked in the direction of rotation of the rotary shaft thereby to produce air pressure therein, so that even if the top foil is a round circle in section, it is forced by the pressure of air thus produced in the centrifugal direction thereof. As a result, the top foil is elastically deformed by the difference in the load resistance thereof, whereby the top foil does not become a round circle in substance and it changes into a nearly round circle. Consequently, at least three wedge-shaped space are formed between the top foil and the rotary shaft.

Alternatively, the radius of curvature of each of the corrugations of the corrugated damp foil may be regularly changed at a predetermined changing rate along the circumferential direction thereof. Namely, the radius of curvature of each of the corrugations of the damp foil is decreased at first predetermined portions of the damp foil and increased at subsequent second predetermined portions thereof and again decreased at further subsequent third predetermined portions thereof at a predetermined changing rate with regularity. As a result, at least three arc portions are formed in the top foil, each of which has a nearly equal large radius of curvature, based on the aforesaid at least three cycles in the damp foil.

The rate of change in radius of curvature of each of the aforesaid corrugations may be variable.

When a resting rotary shaft is located within an axial bore of a bush, gravity causes the center axis of the rotary shaft to be slightly offset from the axis of the bush. When the rotary shaft 1 is spun up and rotated at high speed in the direction of arrow a as shown in FIG. 2*a*, air within the space formed between the shaft 1 and the top foil 5 is sucked in the aforesaid direction of rotation. (This phenomenon is referred to as a “squeeze film effect”.) As a result, the axial center of the shaft 1 is moved upward relative to the resting shaft. Since the bump foil 4 has elasticity and also some air comes in or goes laterally out of the spaces between bumps, a damping effect such as a shock absorber effect can be thereby provided.

Although the present invention has been described in terms of preferred embodiments thereof, it will be obvious to a person skilled in the art that various alterations and modifications are possible without departing from the scope of the present invention which is set forth in the appended claims. For example, it may be possible to combine or change the structures shown in the embodiments in order to adapt the present invention to particular applications. As to the foil assembly, the number of sheet-shaped foil(s) is not limited to the above embodiments, and the present invention can be applied to other types of foils.

Now that the invention has been described,

I claim:

1. A foil bearing, comprising:
a bush (3) having an axial bore;
at least one bump foil (4) having a leading edge (4*a*) and a trailing edge, having undulations between the leading and trailing edge, said undulations having a radial height, and anchored at the leading edge to the bush (3), the undulations having a wavelength;
a top foil (5) for each bump foil (4), the top foil having a leading edge and a trailing edge (5*a*), and anchored at the trailing edge (5*a*) to the bush (3), wherein:
the top foil (5) has, in a non-tensioned state, a larger diameter than the shaft diameter,
the top foil, after assembly of the foil bearing, is in a tensioned state,
a circumferential gap (8) is formed between the top foil (5) leading edge and its trailing edge if there is only one top foil or an adjacent trailing edge (5*a*) if there is more than one top foil,
the gap also extends radially a radial height, and
a bevel or step is formed in the leading edge of the top foil extending circumferentially and radially,
wherein the circumferential length of the bevel or step is one tenth of the wavelength of the undulations in the bump foil or more and
in the radial direction the bevel or step extends one fifth of the radial height of the bump foil or more.

2. The foil bearing of claim 1, wherein the undulations in the bump foil (4) are nearly uniform.

3. The foil bearing of claim 1, wherein said bevel or step is a concave or convex curved shape.

4. The foil bearing of claim 1, wherein said top foil (5) is provided with a dry lubricant surface coating.

5. The foil bearing of claim 1, wherein said top foil is provided with a wear-in surface coating.

6. The foil bearing of claim 1, wherein said top foil (5) trailing edge forms a retaining lug (5*a*), wherein the bush (3) is provided with at least one slot, and wherein top foil retaining lug (5*a*) is inserted into the slot in the bush (3).

7. The foil bearing of claim 1, wherein said top foil (5) trailing edge is spot welded to the bush.

8. A foil bearing, comprising:
a bush (3) having an axial bore;
at least one bump foil (4) having a leading edge (4*a*) and a trailing edge, having undulations between the leading and trailing edge, and anchored at the leading edge to the bush (3);
a top foil (5) for each bump foil (4), the top foil having a leading edge and a trailing edge (5*a*), and anchored at the trailing edge (5*a*) to the bush (3),
wherein the top foil (5) has, in a non-tensioned state, a larger diameter than the shaft diameter,
wherein the top foil, after assembly of the foil bearing, is in a tensioned state,
wherein a circumferential gap (8) is formed between the top foil (5) leading edge and an adjacent trailing edge (5*a*), the gap also extends radially from the top foil trailing edge (5*a*) to the bump foil,
wherein a bevel or step is formed in the leading edge of the top foil, extending into the circumferential gap, and
wherein said bevel or step is step-shaped.

* * * * *